United States Patent [19]

Armstrong

[11] Patent Number: 4,630,287
[45] Date of Patent: Dec. 16, 1986

[54] SECONDARY CHANNEL SIGNALLING IN A QAM DATA POINT CONSTELLATION

[75] Inventor: Thomas Armstrong, Clearwater, Fla.

[73] Assignee: Paradyne Corporation, Largo, Fla.

[21] Appl. No.: 748,748

[22] Filed: Jun. 25, 1985

Related U.S. Application Data

[63] Continuation-in-part of Ser. No. 565,523, Dec. 28, 1983, abandoned, which is a continuation of Ser. No. 299,660, Sep. 8, 1981, abandoned.

[51] Int. Cl.$^4$ .......................... H04J 7/00; H04L 5/12
[52] U.S. Cl. ................................... 375/39; 370/110.1; 370/110.4
[58] Field of Search ...................... 375/38, 39, 42, 58; 332/9 R, 10, 17; 370/11, 12, 20, 37, 110.1, 110.4, 119; 329/135

[56] References Cited

U.S. PATENT DOCUMENTS

| | | | |
|---|---|---|---|
| 3,060,268 | 10/1962 | Pinet | 370/110.4 |
| 4,227,152 | 10/1980 | Godard et al. | 375/13 |
| 4,347,616 | 8/1982 | Murakami | 370/20 |
| 4,389,722 | 6/1983 | Hofmeister | 370/100 |
| 4,525,846 | 6/1985 | Bremer et al. | 375/39 |

*Primary Examiner*—Benedict V. Safourek
*Attorney, Agent, or Firm*—Kane, Dalsimer, Kane, Sullivan & Kurucz

[57] ABSTRACT

A method of adding a secondary channel to a QAM signal mapped in the complex plane is provided. A pair of positions in the mapped complex plane is determined such that one-half the sum of the square of the distances to such positions from the origin is no greater than the square of the distance from the origin to the position of the furthest mapped data point. For secondary channel communication, a data point is shifted from a normal position to one or the other of the new positions with one of said positions assuming a binary "1" for the secondary channel and the other of said positions assuming a binary "0".

5 Claims, 5 Drawing Figures

NORMAL 8 POINT CONSTELLATION

SECONDARY CHANNEL SIGNALLING IN A QAM DATA POINT CONSTELLATION

RELATED APPLICATIONS

This is a continuation-in-part application to application Ser. No. 565,523 filed Dec. 28, 1983 now abandoned which is a continuation of application Ser. No. 299,660 filed Sept. 8, 1981, now abandoned.

BACKGROUND OF THE INVENTION

The present invention relates to data transmission and in particular to an improved signal structure for transmitting a secondary channel in a quadrature amplitude modulation (QAM) constellation.

In U.S. Pat. No. 3,887,768 issued June 3, 1975 to Formey, Jr. et al. for SIGNAL STRUCTURES FOR DOUBLE SIDE BAND QUADRATURE CARRIER MODULATION, a data transmission system is described in which the signal points are mapped in the complex plane on concentric rings. The signal point of each ring is rotated by 45° from those of the next adjacent ring and no point is allowed at the origin. Such signal constellations are widely used in data transmission systems.

To increase the data carrying capabilities of such transmissions systems, it has heretofore been proposed to introduce a secondary channel to the primary channel QAM signal. The problem is to introduce the secondary channel with no degradation of the primary channel and with no substantial variation in the power requirements of the transmission system when the secondary channel is utilized. Heretofore it is has been proposed to introduce the secondary channel by shifting the angular position of the data points. Thus, when the data points assume a first position, a binary "1" is transmitted for the secondary channel and when the data points assume a secondary position, angularly shifted with respect to the first position, a binary "0" is transmitted for the secondary channel. The problem with this procedure is that it significantly reduces or degrades the performance of the primary QAM channel.

In view of the above, it is the principal object of the present invention to provide an improved system for the transmission of secondary channel signalling in a QAM constellation.

A further object of the present invention is to provide such a system which introduces virtually no degradation to the primary channel.

A still further object is to provide such a system in which the secondary channel may be added without any additional power requirements over that of the primary QAM channel.

A still further object is to provide such a system wherein the secondary channel may be asynchronous.

Still other objects and advantages will be self-evident from the following.

SUMMARY OF THE INVENTION

The above and other beneficial objects and advantages are attained in accordance with the present invention by providing a QAM signal mapped in the complex plane with a data point shiftable from its normal position to one of two new positions. The additional data point positions are located in the mapped complex plane such that one-half the sum of the squares of the distances of the new positions from the origin is no greater than the square of the distance from the origin to the position of the furthest point mapped in the complex plane. A binary "1" is assigned to one of the pair of positions and a binary "0" is assigned to the other of the pair of positions. Transmission on the secondary channel results from shifting the data point between the two new positions depending on the data value being transmitted. Secondary channel transmission may thus be attained without any degradation of the primary channel signal.

In a preferred embodiment, one of the additional point locations for the secondary channel is provided at the origin.

BRIEF DESCRIPTION OF THE DRAWINGS

In the accompanying drawings:

FIG. 7 shows a QAM modulator which may be used to practice the invention; and

DETAILED DESCRIPTION OF THE PREFERRED EMBODIMENT

Figure 1:
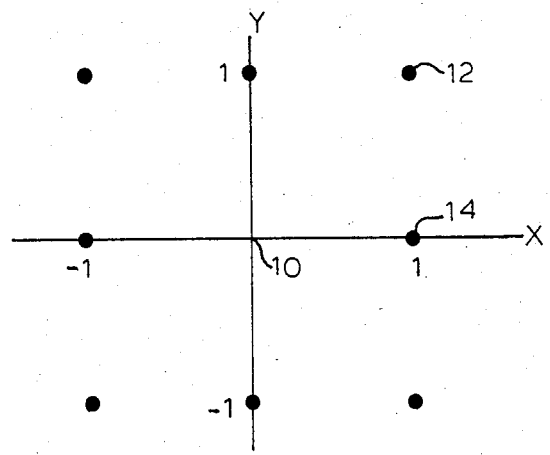
FIG. 1 depicts a 3×3 constellation which contains eight possible data points, the origin being an unacceptable data point.

Reference is now made to the drawings and to FIG. 1 in particular wherein a normal 8 point contellation for a QAM signal mapped in the complex plane is shown. In accordance with such maping, the origin is unoccupied and the remaining data points are disposed on concentric rings. For reasons which are described in detail in my recently issued U.S. Pat. No. 4,271,527 entitled DOUBLE SIDE BAND-QUANDRATURE CARRIER MODULATION SIGNAL STRUCTURE, the maximum power requirement for such a constellation is a function of the distance from the origin 10 to the furthest mapped position 12.

In accordance with the present invention, a secondary channel in introduced by virtue of a mapped data point 14 selecting one of two assigned positions, A or B. Thus, when data point 14 is located as shown in FIG. 1, only primary channel transmission occurs. However, shifting of the data point 14 to assume either of positions A or B results in secondary channel transmission. To this end, one of data point positions A is assigned a binary "0" and the other of the positions is assigned a binary "1". If, for example, position A is assigned a binary "0" and position B a binary "1" then, data point 14 assuming the position A would result in the transmission of a "0" on the secondary channel and data point 14 assuming the position B would result in the transmission of a binary "1" on the secondary channel.

By locating data point positions A and B such that one-half the sum of the square of the distances from the origin to A and B is no greater than the square of the distance from the origin to the position of the furthest mapped data point, the power requirement for the data point 14 assuming position A or B will be no greater than that already necessary for the furthest data point 12. This assumes that during secondary channel transmission the data point will be at position A half the time and at position B the other half of the time.

Figure 2:
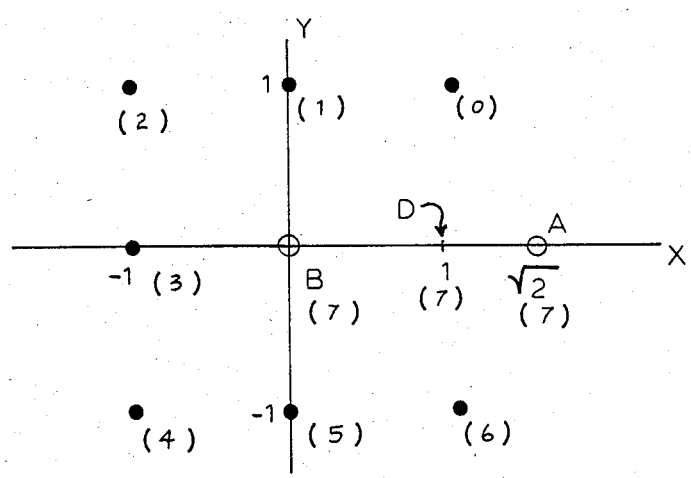
FIG. 2 is a first embodiment of a constellation in accordance with the present invention wherein the data point (1,0) is shifted between the origin (0,0) and 1.4,0)

In FIG. 2, the position of data point B is conveniently chosen at the origin. As a result, the position of data point A may assume any location up to 1.4 without exceeding the power requirements for data point 12.

Figure 3:
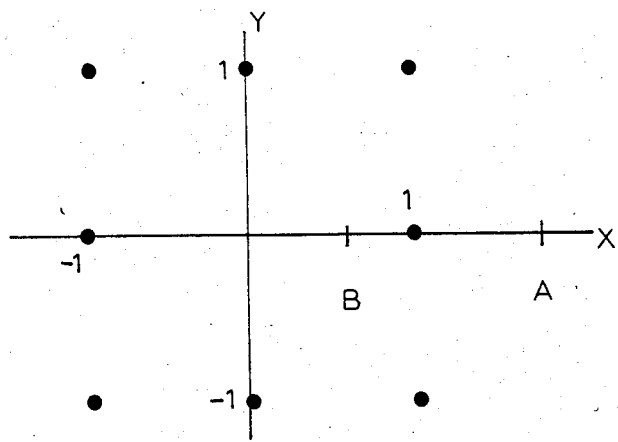
FIG. 3 is an alternate embodiment of the present invention wherein the shifted data point may assume a non-zero position.

In FIG. 3, data point position B is moved from the origin permitting data point position A to likewise be moved from the origin to a position in accordance with the above formula.

It should be noted that transmission of the secondary channel in accordance with the present invention is effected simply by shifting a single data point to one of two assigned positions. As a result, degradation of the primary signal is minimal.

Thus, in accordance with the above, the aformentioned objectives are effectively attained.

Modems for transmitting and receiving quadrature-amplitude modulated signals are well known in the art. For example, in U.S. Pat. No. 3,955,141, granted on May 4, 1976, to Lyon et al, a modem is described for handling time-multiplexed signals. In order to insure the proper demultiplexing of these signals, the transmitter and receiver are synchronized by changing the positions of a number preselected signal constellation points. These constellation points are shifted by the transmitter in response to an internally-generated frame signal.

Figure 4:
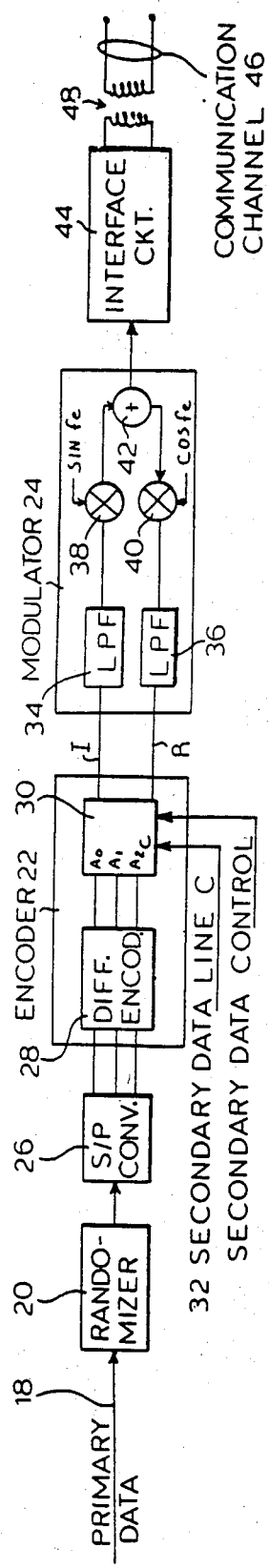

A modem similar to the one described by Lyon et al in the above mentioned U.S. Pat. No. 3,955,141 may be used to transmit a modified QAM data point constellation for secondary channel signaling as follows. The transmitter, as shown in FIG. 4, comprises a randomizer 20, an encoder 22 and a modulator 24. The input bits from a primary data line 18, i.e., the primary data, are fed into a randomizer which scrambles them in a pseudo-random fashion. The scrambled data bits are then fed to encoder 22 through a serial-to-parallel converter 26. The encoder is provided to generate the real and imaginary signals X and Y which define the signal constellation points corresponding to a preselected number of data bits from randomizer 20. The number of output parallel lines from converter 26 depends on the particular encoding scheme used. For an 8 point signal constellation, 3 lines are necessary. Encoder 22 may include a differential encoder 28 for differentially encoding the bits in the normal manner. From encoder 28 the binary bits are then fed to a coordinate signal generator 30. The coordinate signal generator is adapted to generate the X and Y signals in accordance with a preselected encoding scheme. The cordinate signal generator 30 also receives a secondary data signal on line C which, when enabled forces the signal generator to change its signal constellation in accordance with binary signals from a second data line 32. For example, if the primary input lines to generator 30, comprise lines $A_0$, $A_1$ and 13 and secondary line C, then the corresponding output signals X and Y may be defined as shown in Table 1 to generate the signal constellation points of FIG. 2, X and Y corresponding to the in-phase and quadrature components of the QAM signals, respectively.

TABLE 1

| INPUTS | | | | OUTPUTS | |
|---|---|---|---|---|---|
| $A_0$ | $A_1$ | $A_2$ | C | X | Y |
| 0 | 0 | 0 | X | 1 | 1 |
| 0 | 0 | 1 | X | 0 | 1 |
| 0 | 1 | 0 | X | −1 | 1 |

TABLE 1-continued

| INPUTS | | | | OUTPUTS | |
|---|---|---|---|---|---|
| $A_0$ | $A_1$ | $A_2$ | C | X | Y |
| 0 | 1 | 1 | X | −1 | 0 |
| 1 | 0 | 0 | X | −1 | −1 |
| 1 | 0 | 1 | X | 0 | −1 |
| 1 | 1 | 0 | X | −1 | −1 |
| 1 | 1 | 0 | NONE | 1 | 0 |
| 1 | 1 | 1 | 0 | 0 | 0 |
| 1 | 1 | 1 | 1 | 0 | 1.41 |

X = DON'T CARE

The decimal equivalent of each binary word $A_0$, $A_1$, $A_2$ is shown in FIG. 2 in parenthesis. It can be seen from this Table, that except for primary input 111 the generator outputs are not affected by the secondary control signal and the binary data. For 111, if the secondary control signal is disabled, point (0,1) is selected. If the binary control signal is enabled, then generator 30 selects either point A (0,1.41) or point B (0,0) in response to primary input 111 depending in whether the secondary binary data signal is a "0" or a "1".

The X and Y signals from encoder 22 are fed to modulator 24 as shown. The modulator comprises low pass filters 34, 36, and multipliers 38 and 40. The two signals are filtered and then multiplied by a sine and cosine signal at the carrier frequency fc. The multiplied signals are added in summer 42. The output of modulator 24 which comprises quadrature amplitude signals, are fed to a line interface circuit 44 which transfers the modulator output to a communication channel 46 via transformer 48.

Figure 5:
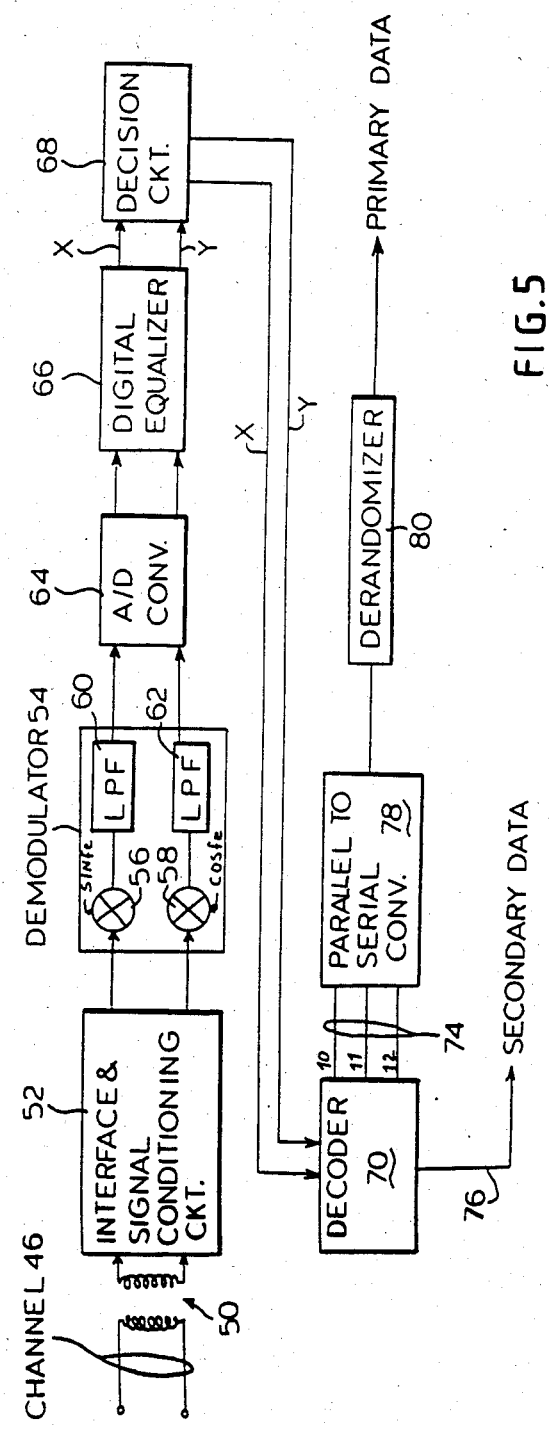
FIG. 5 shows a QAM demodulator which may be used to practice the invention.

Details of the receiver are shown in FIG. 5. Quadrature amplitude signals from channel 46 are transferred by transformer 50 to interface and signal conditioning circuits 52. From circuits 52 the incoming signals are fed to demodulator 54. In the demodulator the signals are multiplied by multipliers 56 and 58 by the sine and cosine of the carrier frequency and low pass filtered by filters 60 and 62. The filter outputs are fed to an analog-to-digital converter 64 and the output of the converter is fed to an equalizer 66. The output of the equalizer is fed to a decision circuit 68 which decides which ideal constellation point corresponds to a incoming QAM signal. The ideal constellation point is characterized by signals X and Y which are identical to the output of the modulator 24 in FIG. 4. The X and Y signals are fed to a decoder 70. This decoder is a point decoder and is adapted to generate three primary binary signals on lines 74 and a secondary binary signal on line 76 for each received QAM signal. Of course if a received signal corresponds to point (0,1) then no secondary output is generated on line 76. The binary signals from lines 74 are converted by a parallel-to-serial converter 78 so that its output is identical to the input of serial-to-parallel converter 26 of FIG. 4. This output is derandomized by derandomizer 80 to eliminate the effect of randomizer 20. The outputs of decoder 72 are generated in conformance with Table 1 and the signal constellation of FIG. 2.

I claim:

1. A method of adding a secondary channel to a QAM signal mapped in the complex plane with data points assuming normal positions on concentric rings comprising the steps of:
   (a) locating a pair of positions in the mapped complex plane (A and B) such that one-half the sum of the square of the distances to such positions from the origin ($A^2+B^2/2$) is no greater than the square of the distance from the origin to the position of the furthest mapped data point;

(b) assigning a binary "1" to the existence of a data point at one of said pair of positions and a binary "0" to the existence of a date point at the other of said pair of positions;

(c) shifting a single data point from a normal position to assume either of said pair of positions to define said secondary channel, the other data points being kept at their normal positions.

2. The method in accordance with claim 1 wherein said pair of positions lie on a line passing through the origin of the complex plane.

3. The method in accordance with claim 2 wherein said shifted data point normal position also lies on said line.

4. The method in accordance with claim 3 wherein said line comprises an axis of said complex plane.

5. The method in accordance with claim 1 wherein one of said pair of positions comprises the origin of the complex plane.

* * * * *